(12) United States Patent
Egawa

(10) Patent No.: US 8,282,215 B2
(45) Date of Patent: Oct. 9, 2012

(54) SPATIAL LIGHT MODULATION DEVICE, PROJECTOR, AND COOLING METHOD FOR SPATIAL LIGHT MODULATION DEVICE

(75) Inventor: Akira Egawa, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 507 days.

(21) Appl. No.: 12/504,002

(22) Filed: Jul. 16, 2009

(65) Prior Publication Data

US 2010/0026964 A1 Feb. 4, 2010

(30) Foreign Application Priority Data

Jul. 30, 2008 (JP) ................. 2008-195863

(51) Int. Cl.
*G03B 21/14* (2006.01)
*G03B 21/16* (2006.01)
*G03B 21/18* (2006.01)
*G03B 21/26* (2006.01)
*G02F 1/1333* (2006.01)
*G02F 1/1343* (2006.01)

(52) U.S. Cl. ............... 353/20; 353/57; 353/60; 349/139; 349/141; 349/161

(58) Field of Classification Search ............ 353/20, 353/52, 54, 57–58, 60; 349/21, 139, 141, 349/143, 151, 161
See application file for complete search history.

(56) References Cited

U.S. PATENT DOCUMENTS

| | | | | |
|---|---|---|---|---|
| 3,981,559 | A * | 9/1976 | Channin | ............... 349/33 |
| 6,549,278 | B2 * | 4/2003 | Tseng | ............... 356/237.2 |
| 7,210,790 | B2 * | 5/2007 | Ishii et al. | ............... 353/61 |
| 7,325,931 | B2 * | 2/2008 | Ikeda et al. | ............... 353/61 |
| 7,407,293 | B2 * | 8/2008 | Ishii et al. | ............... 353/57 |
| 2005/0077103 | A1 * | 4/2005 | Ikeda et al. | ............... 181/225 |

FOREIGN PATENT DOCUMENTS

| JP | 63-092388 U | 6/1988 |
|---|---|---|
| JP | 03-043629 U | 4/1991 |
| JP | 10-319503 A | 12/1998 |
| JP | 2002-107698 | 4/2002 |
| JP | 2002-303880 A | 10/2002 |
| JP | 2005-157065 A | 6/2005 |
| JP | 2005-208188 A | 8/2005 |

OTHER PUBLICATIONS

David B. Go, et al "Ionic winds for locally enhanced cooling" Journal of Applied Physics 102, 053302 (2007).

* cited by examiner

*Primary Examiner* — Tony Ko
*Assistant Examiner* — Jori S Reilly-Diakun
(74) *Attorney, Agent, or Firm* — Maschoff Gilmore & Israelsen

(57) ABSTRACT

A spatial light modulation device includes: a light modulation unit which modulates light according to an image signal; and a first electrode and a second electrode provided on a surface of one of an optical element disposed either on the entrance side of the light modulation unit or the exit side of the light modulation unit and the light modulation unit. Voltage is applied to the first electrodes and the second electrodes.

19 Claims, 4 Drawing Sheets

SPATIAL LIGHT MODULATION DEVICE, PROJECTOR, AND COOLING METHOD FOR SPATIAL LIGHT MODULATION DEVICE

BACKGROUND

1. Technical Field

The present invention relates to a technology of a spatial light modulation device which modulates light according to an image signal, a projector including the spatial light modulation device, and a cooling method for the spatial light modulation device.

2. Related Art

Recently, there is a demand for a projector capable of emitting light having high luminance, and the amount of heat generated from such a projector is increasing with rise of the amount of light supplied therefrom.

When the temperature inside the projector is high due to raised luminance and size reduction of the projector, life of optical elements such as liquid crystal panel and polarization plate becomes short. Currently, such a technology has been proposed which includes a structure for introducing cooling air generated for cooling a liquid crystal panel by a fan toward the surface of the liquid crystal panel (for example, see JP-A-2002-107698).

When air flows in parallel with the surface of the liquid crystal panel or the polarization plate, the flow of air on the surface of the liquid crystal panel or the polarization plate receives resistance due to viscosity of air. Thus, cooling effect provided by cooling air in the related art is only limited effect.

SUMMARY

It is an advantage of some aspects of the invention to provide a spatial light modulation device capable of providing effective cooling by using cooling air, a projector including the spatial light modulation device, and a cooling method for the spatial light modulation device.

A spatial light modulation device according to a first aspect of the invention includes: a light modulation unit which modulates light according to an image signal; and a first electrode and a second electrode provided on a surface of one of an optical element disposed either on the entrance side of the light modulation unit or the exit side of the light modulation unit and the light modulation unit such that voltage is applied to the first electrodes and the second electrodes.

Corona discharge is generated between the first electrode and the second electrode by applying voltage to the first electrode and the second electrode to generate flow of ionized air between the electrodes. The flow of air on the surface where the first electrode and the second electrode are provided reduces resistance generated by viscosity of air, and thus achieves effective heat release by using an air supply unit. Accordingly, the spatial light modulation device can provide preferable cooling effect using cooling air.

It is preferable that the first electrode and the second electrode are made of transparent material and disposed on the surface for transmitting light. According to this structure, the surface for transmitting light can be effectively cooled.

It is preferable that the spatial light modulation device further includes a polarized light selection element as the optical element which transmits polarized light having particular polarization direction. According to this structure, the spatial light modulation device can select polarized light.

It is preferable that the polarized light selection element includes an entrance side polarization plate disposed on the entrance side of the light modulation unit and an exit side polarization plate disposed on the exit side of the light modulation unit. According to this structure, polarized light can be selected on both the entrance side and the exit side of the light modulation unit.

It is preferable that both of the first electrode and the second electrode have comb-tooth shape. By alternately disposing teeth of the first electrode and the second electrode, generation of corona discharge between the first electrode and the second electrode can be easily achieved.

A projector according to a second aspect of the invention includes: a light source device which emits light; and the spatial light modulation device described above which modulates light emitted from the light source device according to an image signal. By using the spatial light modulation device described above, effective cooling of the spatial light modulation device can be achieved. Thus, the projector becomes highly reliable.

It is preferable that the projector further includes an air supply unit which generates flow of air in the vicinity of the surface on which the first electrode and the second electrode are provided. According to this structure, the surface on which the first electrode and the second electrode are provided can be effectively cooled.

A cooling method for a spatial light modulation device which cools a spatial light modulation device having a light modulation unit which modulates light according to an image signal according to a third aspect of the invention includes: applying voltage to the first electrode and the second electrode provided on a surface of one of an optical element disposed either on the entrance side of the light modulation unit or on the exit side of the light modulation unit and the light modulation unit; and flowing air in the vicinity of the surface on which the first electrode and the second electrode are provided. According to this method, effective cooling by using cooling air can be achieved.

BRIEF DESCRIPTION OF THE DRAWINGS

The invention will be described with reference to the accompanying drawings, wherein like numbers reference like elements.

DESCRIPTION OF EXEMPLARY EMBODIMENT

An exemplary embodiment according to the invention is hereinafter described in detail with reference to the drawings.

First Embodiment

Figure 1:
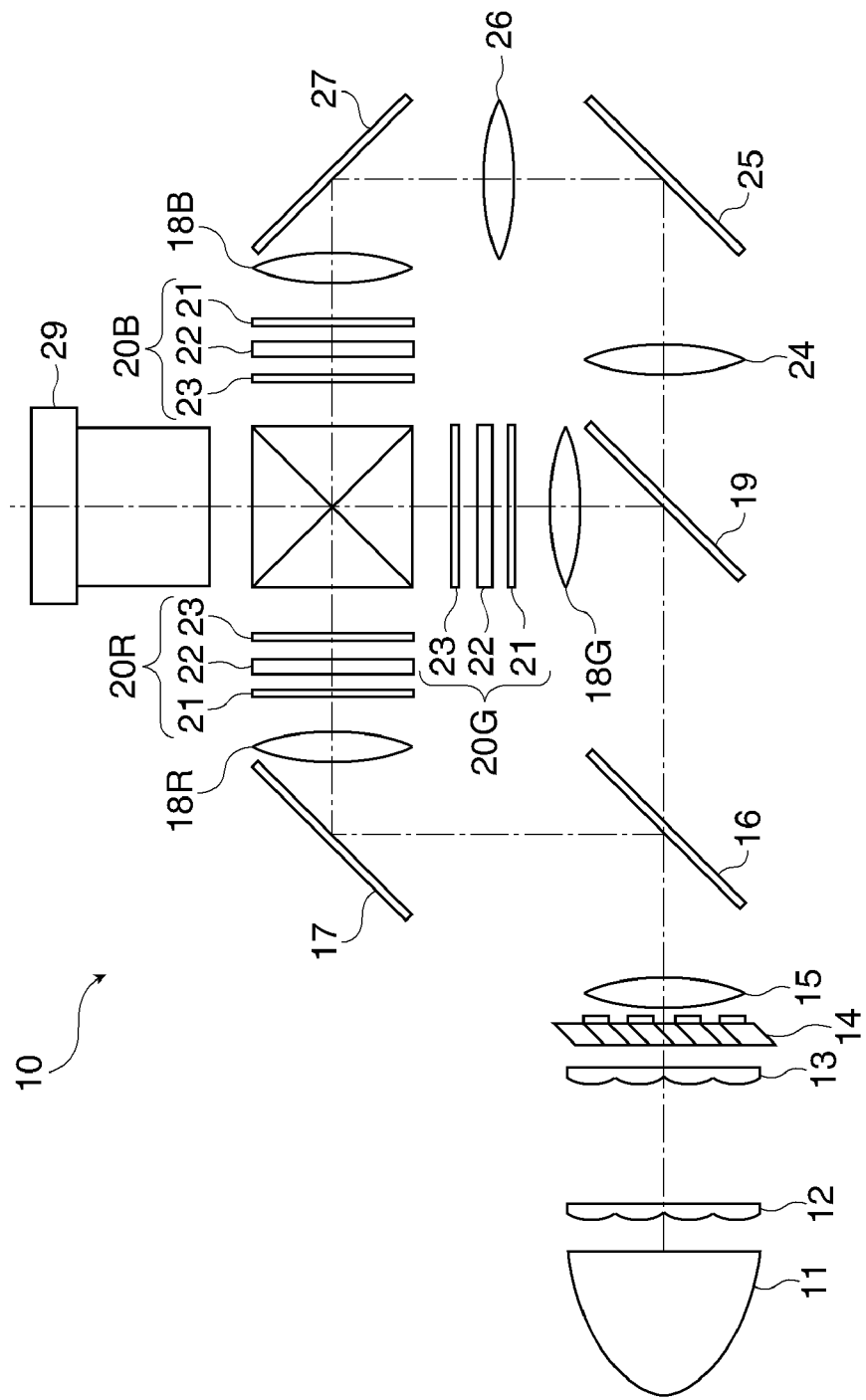
FIG. 1 illustrates a general structure of a projector according to a first embodiment of the invention.

FIG. 1 schematically illustrates a projector 10 according to a first embodiment of the invention. The projector 10 is a front projection type projector which projects light onto a not-shown screen to form images to be viewed using light reflected by the screen. An extra-high pressure mercury lamp 11 is a light source device which emits light containing red (R) light, green (G) light, and blue (B) light. Each of a first integrator lens 12 and a second integrator lens 13 has a plurality of lens elements disposed in arrays. The first integrator lens 12 divides lights emitted from the extra-high pressure mercury lamp 11 into plural parts. The respective lens elements contained in the first integrator lens 12 converge lights emitted from the extra-high pressure mercury lamp 11 in the vicinity of the lens elements of the second integrator lens 13. The lens elements of the second integrator lens 13 form images of the lens elements of the first integrator lens 12 on a spatial light modulation device.

Light having passed through the two integrator lenses 12 and 13 is converted into linear polarized light having a particular polarization direction by a polarization conversion element 14. A superimposing lens 15 stacks the respective images of the lens elements of the first integrator lens 12 on the spatial light modulation device. The first integrator lens 12, the second integrator lens 13, and the superimposing lens 15 equalize intensity distribution of light emitted from the extra-high pressure mercury lamp 11 on the spatial light modulation device. The light released from the superimposing lens 15 enters a first dichroic mirror 16. The first dichroic mirror 16 reflects R light and transmits G and B lights.

The optical path of the R light reflected by the first dichroic mirror 16 is bended by the first dichroic mirror 16 and further by a reflection mirror 17 such that the R light enters an R light field lens 18R. The R light field lens 18R collimates the R light released from the reflection mirror 17 and supplies the collimated R light to an R spatial light modulation device 20R. The R spatial light modulation device 20R is a spatial light modulation device for modulating R light according to an image signal. The R light modulated by the R spatial light modulation device 20R enters a cross dichroic prism 28.

The G and B lights having passed through the first dichroic mirror 16 enters a second dichroic mirror 19. The second dichroic mirror 19 reflects G light and transmits B light. The optical path of the G light reflected by the second dichroic mirror 19 is bended by the second dichroic mirror 19 such that the G light enters a G light field lens 18G. The G light field lens 18G collimates the G light released from the second dichroic mirror 19 and supplies the collimated G light to a G spatial light modulation device 20G. The G spatial light modulation device 20G is a spatial light modulation device for modulating G light according to an image signal. The G light modulated by the G spatial light modulation device 20G enters the cross dichroic prism 28 through a surface different from a surface to which the R light enters.

The B light transmitted by the second dichroic mirror 19 passes a relay lens 24, and bends its optical path by reflection on a reflection mirror 25. The B light reflected by the reflection mirror 25 further passes a relay lens 26, and bends its optical path by reflection on a reflection mirror 27 to enter a B light field lens 18B. Since the optical path of the B light is longer than those of the R and G lights, a relay system including the relay lenses 24 and 26 is provided on the optical path of the B light so as to equalize illumination magnification of the spatial light modulation device for B light with those of the spatial light modulation devices for other color lights.

The B light field lens 18B collimates the B light released from the reflection mirror 27 and supplies the collimated B light to a B spatial light modulation device 20B. The B spatial light modulation device 20B is a spatial light modulation device for modulating B light according to an image signal. The B light modulated by the B spatial light modulation device 20B enters the cross dichroic prism 28 through a surface different from surfaces to which the R and G lights enter. The cross dichroic prism 28 combines the R light, G light, and B light entering in different directions, and releases the combined light toward a projection lens 29. The projection lens 29 projects the light combined by the cross dichroic prism 28 toward the not-shown screen.

The R spatial light modulation device 20R has an entrance side polarization plate 21, a liquid crystal panel 22, and an exit side polarization plate 23. The entrance side polarization plate 21 is an optical element disposed on the light entrance side of the liquid crystal panel 22. The entrance side polarization plate 21 functions as polarized light selection element which transmits only polarized light having a particular polarization direction substantially the same as the polarization direction equalized by the polarization conversion element 14 and absorbs other lights. The liquid crystal panel 22 varies the polarization direction of the polarized light released from the entrance side polarization plate 21 according to an image signal. The liquid crystal panel 22 functions as light modulation unit for modulating light according to an image signal.

The exit side polarization plate 23 is an optical element disposed on the light exit side of the liquid crystal panel 22. The exit side polarization plate 23 functions as polarized light selection element which transmits only polarized light whose polarization direction has been converted by the liquid crystal panel 22 and absorbs other lights, for example. The entrance side polarization plate 21 and the exit side polarization plate 23 are disposed such that polarization axes of these plates 21 and 23 cross each other appropriately at right angles. Each of the G spatial light modulation device 20G and the B spatial light modulation device 20B has the entrance side polarization plate 21, the liquid crystal panel 22, and the exit side polarization plate 23, and has a similar structure as that of the R spatial light modulation device 20R.

Figure 2:
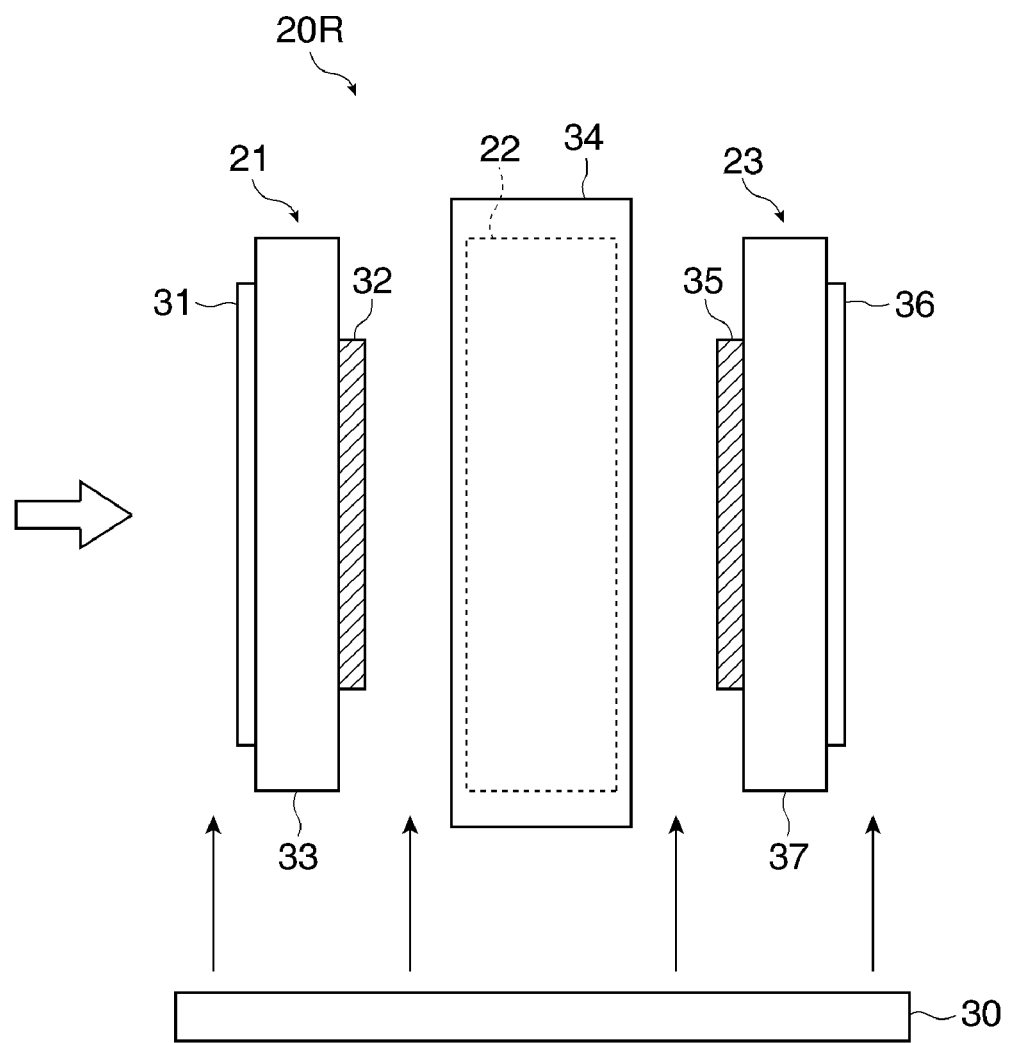
FIG. 2 schematically illustrates a side structure of an R spatial light modulation device and a fan.

FIG. 2 schematically illustrates the side structure of the R spatial light modulation device 20R and a fan 30. The respective structures of the entrance side polarization plate 21, the liquid crystal panel 22, and the exit side polarization plate 23 of the R spatial light modulation device 20R are herein described as a typical example. A white arrow indicates the traveling direction of the R light entering the R spatial light modulation device 20R. The entrance side polarization plate 21 is produced by affixing an entrance side polarization plate electrode unit 31 and a polarization film 32 to a glass substrate 33. The entrance side polarization plate electrode unit 31 is provided on the light entrance surface of the glass substrate 33 for transmitting light. The polarization film 32 is disposed on the exit surface of the glass substrate 33.

The liquid crystal panel 22 has a structure formed by sealing liquid crystals between a pair of substrates made of glass or other transparent material. The liquid crystal panel 22 is held by a supporting member 34 provided around the liquid crystal panel 22. Not-shown liquid crystal panel electrode units are provided on the entrance surface and the exit surface as light transmission surfaces of each substrate of the liquid crystal panel 22. The exit side polarization plate 23 is produced by affixing a polarization film 35 and an exit side polarization plate electrode unit 36 to a glass plate 37. The polarization film 35 is disposed on the entrance surface of the glass substrate 37. The exit side polarization plate electrode unit 36 is disposed on the exit surface of the glass substrate 37 for transmitting light. The fan 30 functions as air supply unit for generating flow of air in the vicinity of the entrance and exit surfaces of the entrance side polarization plate 21, the liquid crystal panel 22, and the exit side polarization plate 23.

Figure 3:
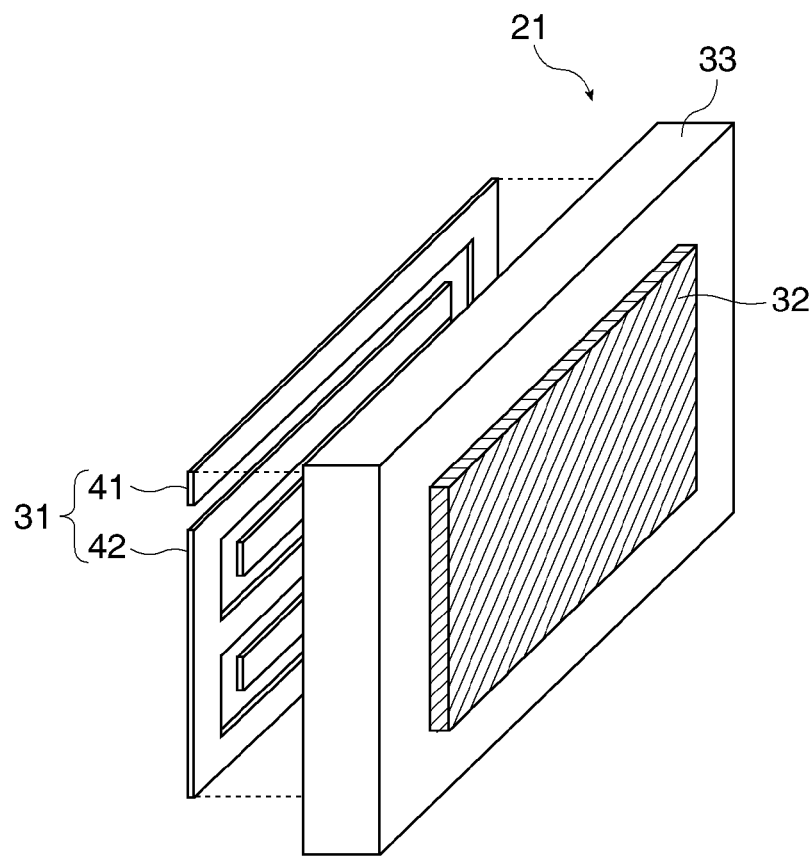
FIG. 3 is a perspective view illustrating an entrance side polarization plate.

FIG. 3 is a perspective view illustrating the structure of the entrance side polarization plate 21 under the condition where the entrance side polarization plate electrode unit 31 is separated. The entrance side polarization plate electrode unit 31 has a first electrode 41 and a second electrode 42. Each of the first electrode 41 and the second electrode 42 is constituted by conductive transparent material such as ITO.

Figure 4:
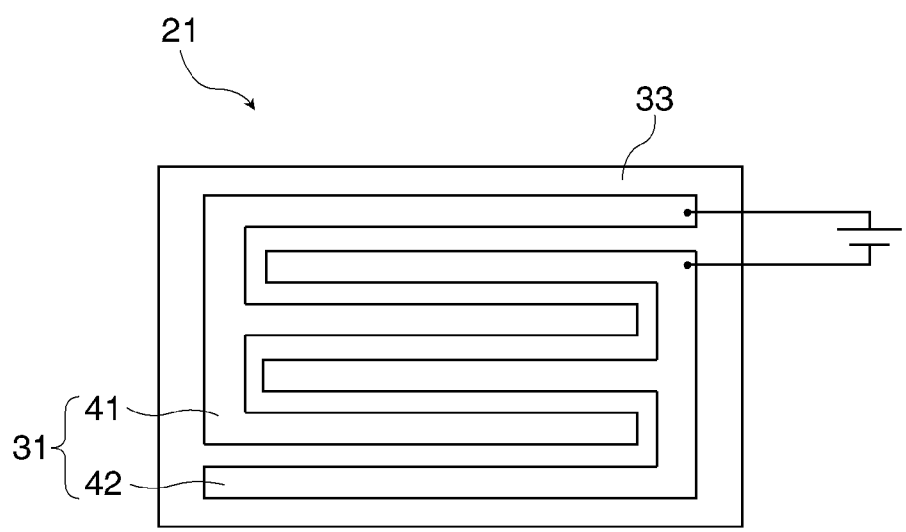
FIG. 4 illustrates a general structure of the entrance surface of the entrance side polarization plate.

FIG. 4 illustrates the general structure of the entrance surface of the entrance side polarization plate 21. Each of the first electrode 41 and the second electrode 42 has a comb-tooth shape in the plan view. The first electrode 41 and the second electrode 42 are disposed such that the teeth of the first electrode 41 and the second electrode 42 are alternately positioned in parallel with one another with spaces left between one another. The first electrode 41 and the second electrode 42 are connected with direct current power source, for example, such that voltage can be applied to the first and second electrodes 41 and 42 in voltage applying step. The first electrode 41 and the second electrode 42 may be connected with alternating current power source.

Corona discharge is generated between the first electrode 41 and the second electrode 42 by applying voltage between the first electrode 41 and the second electrode 42 setting the first electrode 41 and the second electrode 42 as anode and cathode, respectively, for example. Air ionized by corona discharge shifts from the first electrode 41 to the second electrode 42. The shift of air from the first electrode 41 to the second electrode 42 reduces resistance caused by viscosity of air on the entrance surface of the entrance side polarization plate 21. In air supplying step, airflow in the vicinity of the surface on which the first electrode 41 and the second electrode 42 are provided is generated by the fan 30. Heat release from the entrance side polarization plate 21 using the air supply from the fan 30 can be effectively achieved by reducing resistance caused by viscosity of air and promoting airflow on the entrance surface of the entrance side polarization plate 21.

The voltage necessary for discharge can be lowered by disposing the first electrode 41 and the second electrode 42 as close to one another as possible. Thus, by alternately disposing the teeth of the first electrode 41 and the second electrode 42 having comb-tooth shapes to widen the portions of the first electrode 41 and the second electrode 42 close to one another, airflow can be effectively produced on the entrance surface of the entrance side polarization plate 21. The entrance side polarization plate electrode unit 31 and the polarization film 32 of the entrance side polarization plate 21 are not required to be disposed on the entrance surface and the exit surface of the entrance side polarization plate 21, respectively, but may be disposed oppositely on the exit surface and the entrance surface of the entrance side polarization plate 21, respectively.

Figure 5:
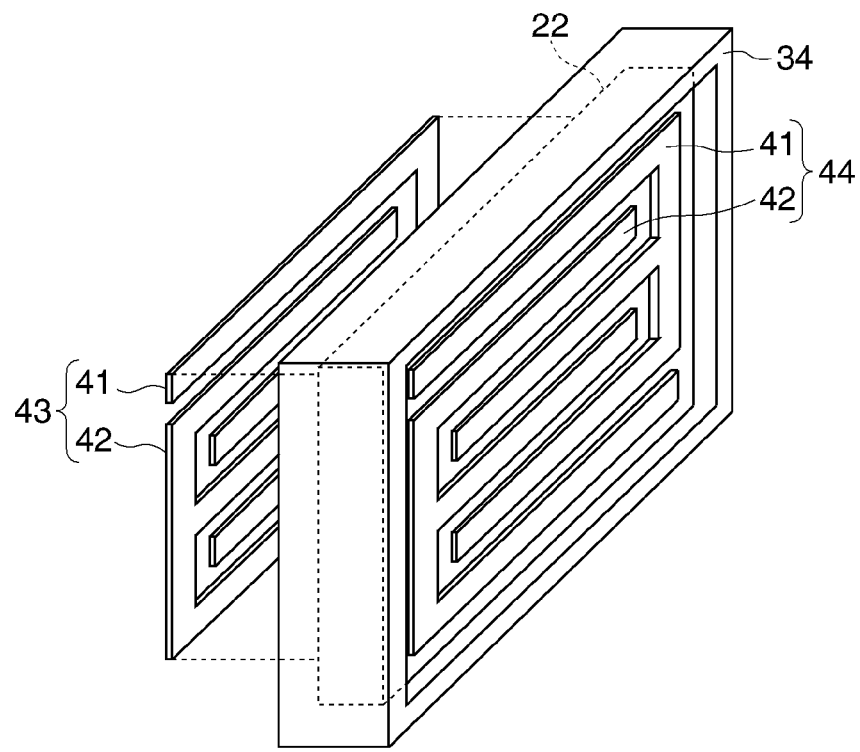
FIG. 5 is a perspective view illustrating a liquid crystal panel attached to a supporting member.

FIG. 5 is a perspective view illustrating the liquid crystal panel 22 attached to the supporting member 34, showing the condition where a liquid crystal panel electrode unit 43 provided on the entrance surface of the liquid crystal panel 22 is separated. The liquid crystal panel 22 has a liquid crystal panel electrode unit 44 attached to the exit surface as well as the liquid crystal panel electrode unit 43 disposed on the entrance surface. Each of the liquid crystal panel electrode units 43 and 44 has the first electrode 41 and the second electrode 42.

The structures of the first electrode 41 and the second electrode 42 provided on the liquid crystal panel electrode units 43 and 44 are similar to those of the first electrode 41 and the second electrode 42 provided on the entrance side polarization plate 21. Corona discharge is generated between the first electrode 41 and the second electrode 42 by applying voltage between the first electrode 41 and the second electrode 42. Similarly to the case of the entrance side polarization plate 21, flow of air on the entrance surface and the exit surface of the liquid crystal panel 22 is promoted by corona discharge thus generated such that heat release from the liquid crystal panel 22 by using air supplied from the fan 30 can be effectively achieved. The liquid crystal panel 22 is not required to have both the liquid crystal panel electrode units 43 and 44 corresponding to the entrance surface and the exit surface, respectively, but may have one liquid crystal panel electrode unit only on either the entrance surface or the exit surface.

Figure 6:
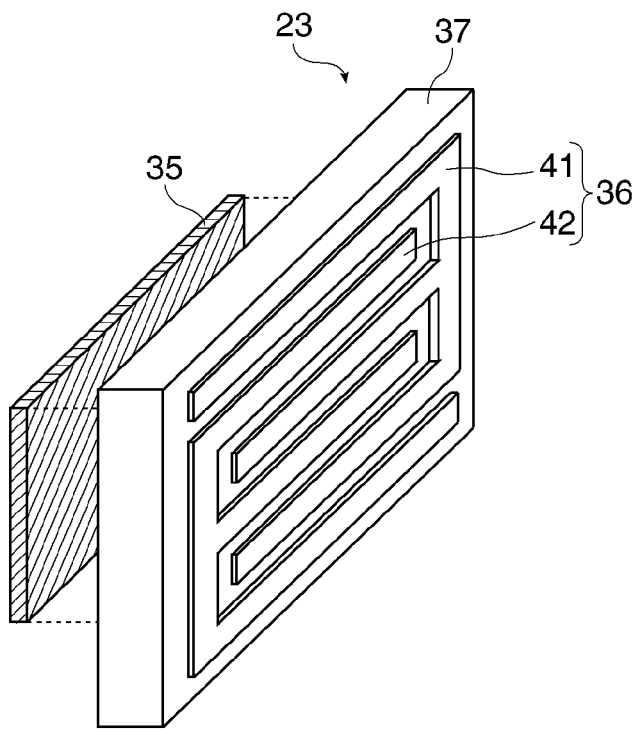
FIG. 6 is a perspective view illustrating an exit side polarization plate.

FIG. 6 is a perspective view illustrating the exit side polarization plate 23 in the condition where the polarization film 35 is separated. The exit side polarization plate electrode unit 36 has the first electrode 41 and the second electrode 42. The structures of the first electrode 41 and the second electrode 42 provided on the exit side polarization plate electrode unit 36 are similar to those of the first electrode 41 and the second electrode 42 provided on the entrance side polarization plate 21. Corona discharge is generated between the first electrode 41 and the second electrode 42 by applying voltage between the first electrode 41 and the second electrode 42. Similarly to the case of the entrance side polarization plate 21, flow of air on the exit surface of the exit side polarization plate 23 is promoted by corona discharge thus generated such that heat release from the exit side polarization plate 23 by using air supplied from the fan 30 can be effectively achieved. The exit side polarization plate 23 is not required to have the polarization film 35 and the exit side polarization plate electrode unit 36 on the entrance surface and the exit surface of the exit side polarization plate 23, respectively, but oppositely on the exit surface and the entrance surface of the exit side polarization plate 23, respectively.

The entrance side polarization plates 21, the liquid crystal panels 22, and the exit side polarization plates 23 of the G spatial light modulation device 20G and the B spatial light modulation device 20B have structures similar to those of the entrance side polarization plate 21, the liquid crystal panel 22, and the exit side polarization plate 23 of the R spatial light modulation device 20R. The fan 30 supplies cooling air to the respective spatial light modulation devices 20R, 20G, and 20B. By these structures, the respective spatial light modulation devices 20R, 20G, and 20B can be effectively cooled using cooling air. The effective cooling of the spatial light modulation devices 20R, 20G, and 20B contributes to prevention of deterioration of the spatial light modulation devices 20R, 20G, and 20B. Since deterioration of the spatial light modulation devices 20R, 20G, and 20B is prevented, the projector 10 becomes highly reliable.

The shapes of the first electrode 41 and the second electrode 42 constituting the entrance side polarization plate electrode unit 31, the liquid crystal panel electrode units 43 and 44, and the exit side polarization plate electrode unit 36 are not limited to the shapes described with reference to FIG. 4. The first electrode 41 and the second electrode 42 may have any shapes as long as effective heat release from the spatial light modulation devices 20R, 20G, and 20B can be achieved by corona discharge generated between the first electrode 41 and the second electrode 42.

The first electrode 41 and the second electrode 42 are not required to be provided on all of the entrance side polarization plate 21, the liquid crystal panel 22, and the exit side polarization plate 23, but may be disposed at least on a surface of an optical element provided at least either on the entrance side or the exit side of the liquid crystal panel 22 and the liquid crystal panel 22. The liquid crystal panel 22 including components such as liquid crystal layer, black matrix, and various types of wires, and the exit side polarization plate 23 which absorbs lights other than the polarization light having the predetermined polarization direction contained in the lights whose polarization condition has been changed by the liquid crystal panel 22 often exhibit considerable temperature increase. It is therefore desirable that the first electrode 41 and the second electrode 42 are provided on both the liquid crystal panel 22 and the exit side polarization plate 23 of each of the respective spatial light modulation devices 20R, 20G, and 20B.

The light source unit of the projector 10 is not limited to the extra-high pressure mercury lamp 11, but may be lamp other than the extra-high pressure mercury lamp 11, or other light source such as light emission diode element (LED) and laser beam source. The projector 10 is not required to have the spatial light modulation device for each of the color lights, but may have one spatial light modulation device capable of modulating two, three or more color lights. The projector 10 may be a so-called rear projector which supplies light to one surface of a screen and forms an image to be viewed using light released from the other surface of the screen.

The entire disclosure of Japanese Patent Application No. 2008-195863, filed Jul. 30, 2008 is expressly incorporated by reference herein.

What is claimed is:

1. A spatial light modulator device, comprising:
   a light modulation unit which modulated light according to an image signal; and
   a first electrode and a second electrode provided on an outer surface of exterior glass panels surrounding the light modulation unit, wherein a voltage is applied to the first electrode and the second electrode.

2. The spatial light modulation device according to claim 1, wherein the first electrode and the second electrode are made of transparent material.

3. The spatial light modulation device according to claim 1, further comprising a polarized light selection element disposed on the light entrance side of the light modulation unit or the light exit side of the light modulation unit, wherein the polarized light section element transmits polarized light having particular polarization direction.

4. The spatial light modulation device according to claim 3, wherein the polarized light selection element includes an entrance side polarization plate disposed on the light entrance side of the light modulation unit and an exit side polarization plate disposed on the light exit side of the light modulation unit.

5. The spatial light modulation device according to claim 1, wherein shape of the first electrode and the second electrode is capable of generating corona discharge.

6. The spatial light modulation device according to claim 1, wherein both of the first electrode and the second electrode have comb-tooth shape.

7. The spatial light modulation device according to claim 3, wherein a third electrode and a fourth electrode are provided on a surface of the polarized light section element which is disposed on the light exit side of the light modulation unit.

8. A projector, comprising:
   a light source device which emits light; and
   the spatial light modulation device according to claim 1 which modulates light emitted from the light source device according to an image signal.

9. The projector according to claim 8, further comprising an air supply unit which generates flow of air in the vicinity of the surface on which the first electrode and the second electrode are provided.

10. A cooling method for a spatial light modulation device which cools a spatial light modulation device having a light modulation unit which modulates light according to an image signal and an optical element disposed on the light entrance side or the light exit side of the light modulation unit, the cooling method comprising:
    applying voltage to a first electrode and a second electrode provided on an outer surface of exterior glass panels of the light modulation unit and a surface of the optical element; and
    flowing air in the vicinity of the surface of the exterior glass panels on which the first electrode and the second electrode are provided, such that the air flows over the first and second electrode.

11. A spatial light modulation device, comprising:
    a light modulation unit which modulates light according to an image signal;
    an optical element disposed on the light entrance side or the light exit side of external glass panels of the light modulation unit; and
    a first electrode and a second electrode provided on a surface of the optical element, wherein a voltage is applied to the first electrode and the second electrode.

12. The spatial light modulation device according to claim 11, wherein the first electrode and the second electrode are made of transparent material.

13. The spatial light modulation device according to claim 11, wherein the optical element is a polarized light selection element which transmits polarized light having particular polarization direction.

14. The spatial light modulation device according to claim 13, wherein the polarized light selection element comprises an entrance side polarization plate disposed on the light entrance side of the light modulation unit and an exit side polarization plate disposed on the light exit side of the light modulation unit.

15. The spatial light modulation device according to claim 11, wherein shape of the first electrode and the second electrode is capable of generating corona discharge.

16. The spatial light modulation device according to claim 11, wherein both of the first electrode and the second electrode have comb-tooth shape.

17. The spatial light modulation device according to claim 11, further comprising a third electrode and a fourth electrode, wherein the first electrode and the second electrode are provided on a surface of the optical element disposed on the light entrance side of the light modulation unit and the third electrode and the fourth electrode are provided on a surface of the optical element disposed on the light exit side of the light modulation unit.

18. A projector, comprising:
    a light source device which emits light; and
    the spatial light modulation device according to claim 11 which modulates light emitted from the light source device according to an image signal.

19. The projector according to claim 18, further comprising an air supply unit which generates flow of air in the vicinity of the surface on which the first electrode and the second electrode are provided.

* * * * *